(12) United States Patent
Nicolosi et al.

(10) Patent No.: US 11,955,877 B2
(45) Date of Patent: Apr. 9, 2024

(54) METHODS AND DEVICES FOR ADAPTIVE OUTPUT SAMPLING FOR POWER CONVERTERS

(71) Applicant: STMicroelectronics S.r.l., Agrate Brianza (IT)

(72) Inventors: Alessandro Nicolosi, Dresano (IT); Giovanni Sicurella, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 153 days.

(21) Appl. No.: 17/387,296

(22) Filed: Jul. 28, 2021

(65) Prior Publication Data
US 2023/0034912 A1  Feb. 2, 2023

(51) Int. Cl.
*H02M 1/00* (2006.01)
*H02M 3/158* (2006.01)

(52) U.S. Cl.
CPC ......... *H02M 1/0035* (2021.05); *H02M 3/158* (2013.01)

(58) Field of Classification Search
CPC .................. H02M 1/0035; H02M 3/155–1588
See application file for complete search history.

(56) References Cited

U.S. PATENT DOCUMENTS

| | | | |
|---|---|---|---|
| 6,366,070 B1 | 4/2002 | Cooke et al. | |
| 8,274,266 B2 | 9/2012 | Engelhardt et al. | |
| 2002/0057080 A1* | 5/2002 | Telefus | H02M 3/156 |
| | | | 323/283 |
| 2015/0003117 A1 | 1/2015 | Ferrazza et al. | |
| 2015/0311795 A1 | 10/2015 | Yang et al. | |
| 2017/0187286 A1* | 6/2017 | Kunz | H02M 3/156 |
| 2018/0048320 A1 | 2/2018 | Zanetta | |
| 2019/0229626 A1 | 7/2019 | Phadke | |
| 2021/0384826 A1* | 12/2021 | Karadi | H02M 3/156 |

OTHER PUBLICATIONS

Reverter, Ferran et al., "Efficiency Optimization in Burst-Mode Buck DC/DC Converters for Sensor Nodes," IEEE Sensors Journal, vol. 18, No. 17., Sep. 1, 2018, pp. 7141-7149.

* cited by examiner

*Primary Examiner* — Fred E Finch, III
(74) *Attorney, Agent, or Firm* — Slater Matsil, LLP

(57) ABSTRACT

A method to operate a DC-DC power converter in a low power burst mode, the method including sampling an output voltage of the DC-DC power converter with a sampling frequency to determine when to initiate a burst for the low power burst mode; and adapting the sampling frequency based on the output voltage.

20 Claims, 7 Drawing Sheets

METHODS AND DEVICES FOR ADAPTIVE OUTPUT SAMPLING FOR POWER CONVERTERS

TECHNICAL FIELD

The present invention relates generally to systems and method to adapt a sampling frequency for an output of a power converter in a low-power burst mode of operation.

BACKGROUND

Power converters may operate in a low-power burst mode to conserve power resources. When a burst mode is enabled, the power converter is turned on and off as needed to maintain a minimum voltage level, which uses less power than continuous operation. The bursts are used as needed to sustain an output of the converter. In discrete-time burst modes, the voltage level is monitored to determine whether a burst is needed by sampling the output of the power converter. Monitoring circuits, and their auxiliaries, are turned on with a sampling frequency. If the sampling frequency is too low, transient fluctuations in the output load may be missed. If the sampling frequency in too high, resources may be wasted unnecessarily turning monitoring equipment on and off. The efficiency and efficacy of the burst mode is thus impacted by the sampling frequency.

SUMMARY

In accordance with an embodiment, a method to operate a DC-DC power converter in a low power burst mode includes sampling an output voltage of the DC-DC power converter with a sampling frequency to determine when to initiate a burst for the low power burst mode and adapting the sampling frequency based on the output voltage.

In accordance with an embodiment, a system to set a sampling frequency of an output voltage of a DC-DC power converter during a low power burst mode of the DC-DC power converter includes a frequency-adaptation circuit configured to receive a clock signal having a first frequency and output an adapted clock signal having an adapted frequency that depends on the output voltage of the DC-DC power converter; and a voltage-monitoring circuit enabled by the adapted clock signal to sample the output voltage of the DC-DC power converter with the adapted frequency.

In accordance with an embodiment, a system to provide an adapted sampling frequency for sampling an output voltage of a DC-DC power converter in a low power burst mode includes an oscillator configured to produce a clock signal; a frequency-adaptation circuit configured to receive the clock signal and output an adapted clock signal including the adapted sampling frequency, the adapted sampling frequency being determined by a frequency-selection signal; and a tracking circuit configured to receive data indicating when a burst for the low power burst mode is initiated and output the frequency-selection signal depending on the data.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

DC-DC power converters have many known uses, for example, providing regulated controlled output voltage from an unregulated input voltage. Unfortunately, DC-DC converters become less efficient when they have low output power (low current or voltage) as the ratio of switching losses to the output power increases. DC-DC converters may be configured to operate in a low-power burst mode to improve the efficiency of the power converter during low power operation of a device.

Figure 1:
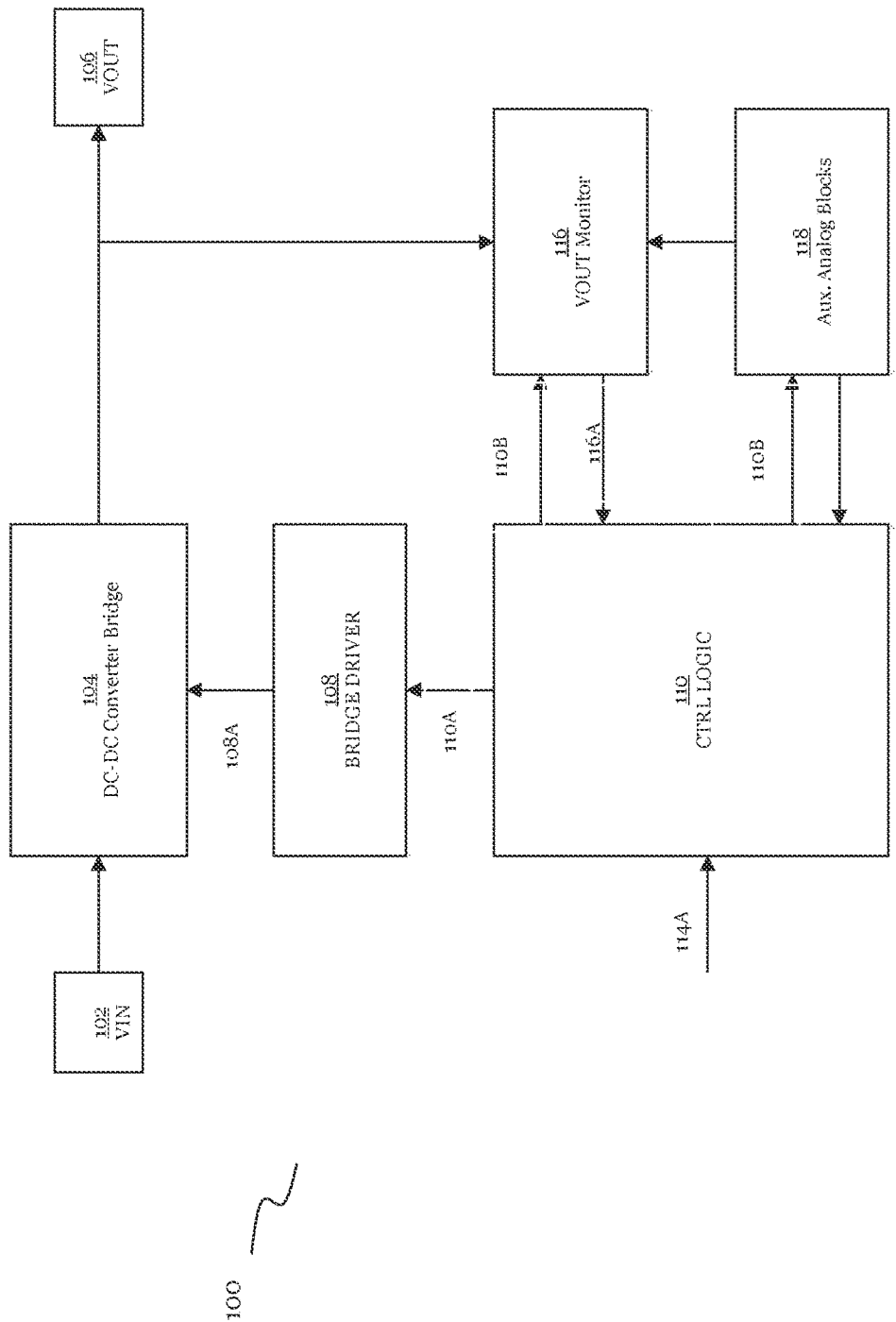
FIG. 1 depicts a system for operating a DC-DC power converter in a low-power burst mode.

FIG. 1 depicts a system 100 for operating a DC-DC power converter in a discrete-time low-power burst mode.

The system 100 includes a power source 102 to supply an unregulated input voltage (VIN) to a DC-DC converter bridge 104. During normal operation, the DC-DC converter bridge 104 provides a regulated output voltage (VOUT) to an output 106 based on a driving signal 108A.

During low power operation, the DC-DC converter bridge 104 is only driven in sporadic bursts when output needs to restored to a proper level for low power operation. The system 100 utilizes less power in between bursts than it would during normal operation when the DC-DC converter bridge 104 is driven continuously thereby providing some power efficiencies. However, these efficiencies are limited by the sampling frequency used to monitor the need for power.

In the system 100, the sampling frequency is determined by a clock signal 114A. The clock signal 114A is received by a control logic circuit 110. The control logic circuit 110 periodically enables sampling of the output of the DC-DC converter bridge 104 according to the frequency of the clock signal 114A by providing an enabling signal 110B to a voltage monitor 116 and auxiliary analog block 118. The auxiliary analog block 118, may include components that are also for sampling of the output voltage to support operation of the voltage monitor 116 and initiate bursts. The voltage monitor 116 senses the voltage at the output 106 and communicates with the control logic circuit 110. The control logic circuit 110 triggers a command signal 110A to a bridge driver 108 to initiate a burst, when needed. The bridge driver 108a responds to drive the DC-DC converter bridge 104 according to the command signal, which raises the voltage level at the output 106.

The need for a burst is determined by the level of the output voltage sensed by the voltage monitor 116. If sampled voltage falls below a threshold, a burst is initiated. Otherwise, the voltage monitor 116 and auxiliary circuits are powered down to wait for the next sample. The voltage monitor 116 and auxiliary analog blocks 118 consume power each time they sample the output voltage. More sampling thus equals more power consumption. As a result, the higher the sampling frequency of the output voltage, the less efficient the burst mode becomes. However, if the sampling frequency is too low, transient fluctuations in the output voltage may be missed thereby creating complications in the system 100 or other devices that received the regulated power at the output 106. A static sampling frequency limits the efficiency of the system because the sampling remains the same despite changes to the load.

The efficiency of a DC-DC converter may be improved by using an adaptable clock signal to determine the sampling frequency used to monitor the output voltage. An adaptable clock signal may adjust as the load varies so unneeded samples are cut out when the output load declines. And, the sampling rate may be increased when the load increases so transient fluctuations are not missed. In various embodiments, an adaptable sampling frequency may also produce more predictable power-efficiency benefits. With a static sampling frequency, the efficiency of the system changes because the ration of bursts and samples will vary as the load varies. However, an adapted frequency allows the ratio of bursts to samples to be maintained more consistently, or even pegged to each other. The efficiency of such devices and methods may thus be more predictable. In various embodiments, it may be advantageous to maintain the sampling frequency so that it is at least twice that of the burst frequency in accordance with the general Shannon theorem for sampling, which states that to reconstruct a signal the sampling frequency must be at least the signal frequency.

Figure 2:
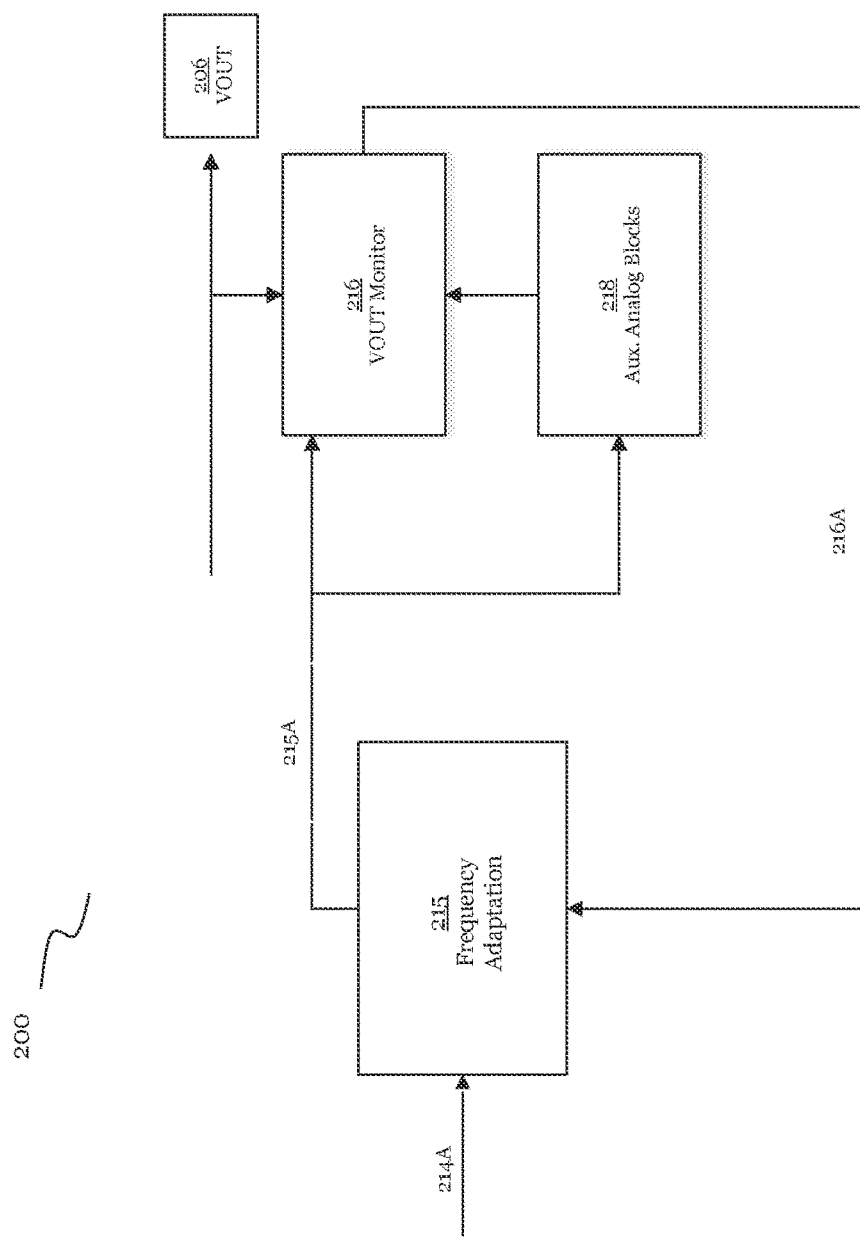
FIG. 2 depicts a system to adaptively set a sampling frequency of the regulated voltage of an electric load during a low power burst mode of an embodiment.

FIG. 2 depicts a system to adaptively set a sampling frequency of the regulated voltage of an electric load during a low power burst mode 200 of an embodiment.

The system to adaptively set a sampling frequency of the regulated voltage of an electric load during a low power burst mode 200 may include a frequency adaptation circuit 215. The frequency adaptation circuit 215 may be digital in various embodiments. The frequency adaptation circuit 215 may receive a clock signal 214A. The frequency adaption circuit 215 may also be in communication (directly or indirectly) with a voltage monitor 216. As will be appreciated, the voltage monitor may be realized in different ways in various embodiments. For example, a comparator may compare output voltage to a reference voltage, or the output voltage may be converted in an equivalent current and then compared to a reference current. In various embodiments, an output signal 216A from the voltage monitor 216 may be supplied to the frequency adaptation circuit 215. The voltage monitor 216, when enabled, may sense the voltage at the output 206 of a power converter (like a DC-DC power converter).

The frequency adaptation circuit 215 may output an adapted clock signal 215A that depends on the clock signal 214A and the voltage at the output 206 sensed by the voltage monitor 216. In various embodiments, the frequency of the clock signal 214A may be constant. The adapted clock signal 215A can be adapted to account for changes in the load coupled to a DC-DC converter to improve the power efficiency of the system to set a sampling frequency of the regulated output voltage of an electric load during a low power burst mode 200.

For example, the frequency of the adapted clock signal 215A may be increased as the load increases and be decreased as the load decreases. The adapted clock signal 215A may then be used to enable and disable the voltage monitor 216 and the auxiliary analog blocks 218 to sample the output voltage with a frequency determined by the adapted clock signal 215A. Depending on the voltage at the output 206, a burst may or may not be initiated. In various embodiments, the frequency adaptation circuit 215 may comprise a programmable frequency divider that divides the frequency of the clock signal 214A to generate the adapted clock signal 215A. The divisors for the programmable frequency divider may be determined based on the sampling of the voltage level sensed by the voltage monitor 216. In various embodiments, a programmable frequency multiplier may be used to generate an adapted clock signal 215A that is a product of the clock signal 214A. Multipliers for the programmable frequency multiplier may be determined based on the voltage level sensed by the voltage monitor 216.

Figure 3:
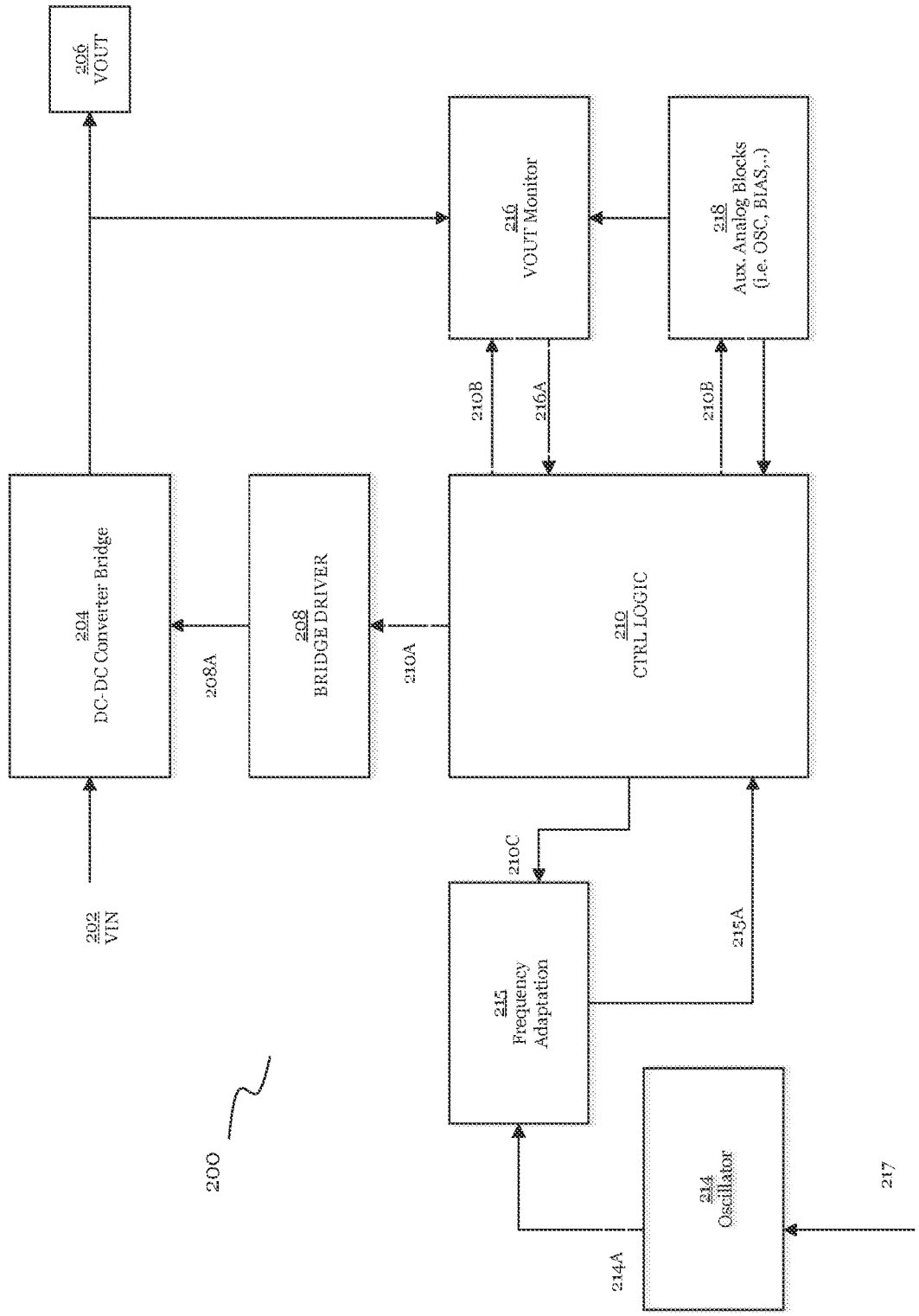
FIG. 3 depicts a system to set a sampling frequency of the regulated voltage of an electric load during a low power burst mode in accordance with an embodiment.

FIG. 3 depicts a system to set a sampling frequency of the regulated output of an electric load during a low power burst mode 200 in accordance with an embodiment.

In various embodiments, the system to set a sampling frequency of the regulated output voltage of an electric load during a low power burst mode 200 may include a DC-DC converter bridge 204. The DC-DC converter bridge 204 may receive a voltage supply (VIN) 202. The DC-DC converter bridge 204 provides a regulated output voltage to an output 206 based on a driving signal 208A.

During low power burst-mode operation, the DC-DC converter bridge 204 may be driven in sporadic bursts when more power is needed, which may be determined by the voltage level sensed at the output 206 by the voltage monitor 216. The voltage monitor 216 may monitor the voltage at the output 206 with a frequency that is determined by an adapted clock signal 215A.

The system to set a sampling frequency of the regulated output voltage of an electric load during a low power burst mode 200 may include an oscillator 214 to provide the clock signal 214A to the frequency adaption circuit 215. In various embodiments, the oscillator 214 may comprise a low frequency oscillator. It may be advantageous to utilize a low frequency oscillator to limit power requirements of the oscillator 214.

In various embodiments, operation of the oscillator 214 may be triggered by a burst-mode enable signal. The burst-mode enable signal 217 may comprise a flag that indicates when a system is in a low-power mode (such as a standby mode). It will also be appreciated that the burst-mode enable signal 217 may also be triggered by operating conditions such as the current drawn by the load. In various embodiments, other conditions may trigger a change to the burst mode of operation.

When in the low-power burst mode (for example, when enabled by burst-mode enable signal 217), the oscillator 214 may output a clock signal 214A. In various embodiments, the oscillator 214 may only operate when enabled by the burst-mode enable signal 217.

The clock signal 214A may be received by the frequency adaptation circuit 215, which may adapt the signal based on the output load as measured by the sampling of the regulated output voltage. The frequency adaptation circuit 215 may output an adapted clock signal 215A to a control logic circuit 210. The control logic circuit 210 may then enable sampling of the output of the DC-DC converter bridge 204 according to the frequency of the adapted clock signal 215A by providing an enabling signal 210B to the voltage monitor 216 and auxiliary analog block 218.

The auxiliary analog block 218 may include a reference-voltage generator for the voltage monitor 216, biasing circuitry for the voltage monitor 216, an oscillator used to time output bursts, and other circuitry to support operation of the voltage monitor 216 or converter. The adapted clock signal 215A may have an initial or default setting. In various embodiments, the initial frequency of the adapted clock signal 215A may be equal to the frequency of the clock signal 214A.

The voltage monitor 216 may sense the voltage at the output 206 when enabled and communicate with the control logic circuit 210. Output signal 216A from the voltage monitor 216 may be provide to the control logic circuit 210. The control logic circuit 210 may trigger a command signal 210A to a bridge driver 208 to initiate a burst, when needed, based on the voltage sampled. The burst may raise the voltage level at the output 206.

The need for a burst may be determined depending on the output voltage sensed by the voltage monitor 216. If sampled voltage falls below a threshold, a burst may be initiated by the control logic circuit 210. A command signal 210A may be provided to a bridge driver 208. And, in turn, the bridge driver may provide switching signals for operation of the DC-DC converter bridge 204. If the output voltage sampled by the voltage monitor 216 is above a threshold, the voltage monitor 216 and auxiliary circuits may be powered down to wait for the next sample.

In various embodiments, the voltage monitor 216 may communicate the voltage sampled at the output 206 the control logic circuit 210 via output signal 216A. The control logic circuit 210 may provide a frequency command, or frequency-selection signal 210C to the frequency adaption circuit 215. In various embodiments, the output signal 216A may be provided directly to a frequency adaptation circuit 215.

The frequency-selection signal 210C may be adjusted depending on the voltage sampled at the output 206. And, the frequency adaption circuit 215 may change the frequency of the adapted clock signal 215A depending on the frequency-selection signal 210C. For example, the frequency adaption circuit 215 may comprise a frequency divider where the clock signal 215A has a frequency that is a quotient of the frequency of the clock signal 214A and a divisor. The divisor may be selected depending on the frequency-selection signal 210C.

Figure 4:
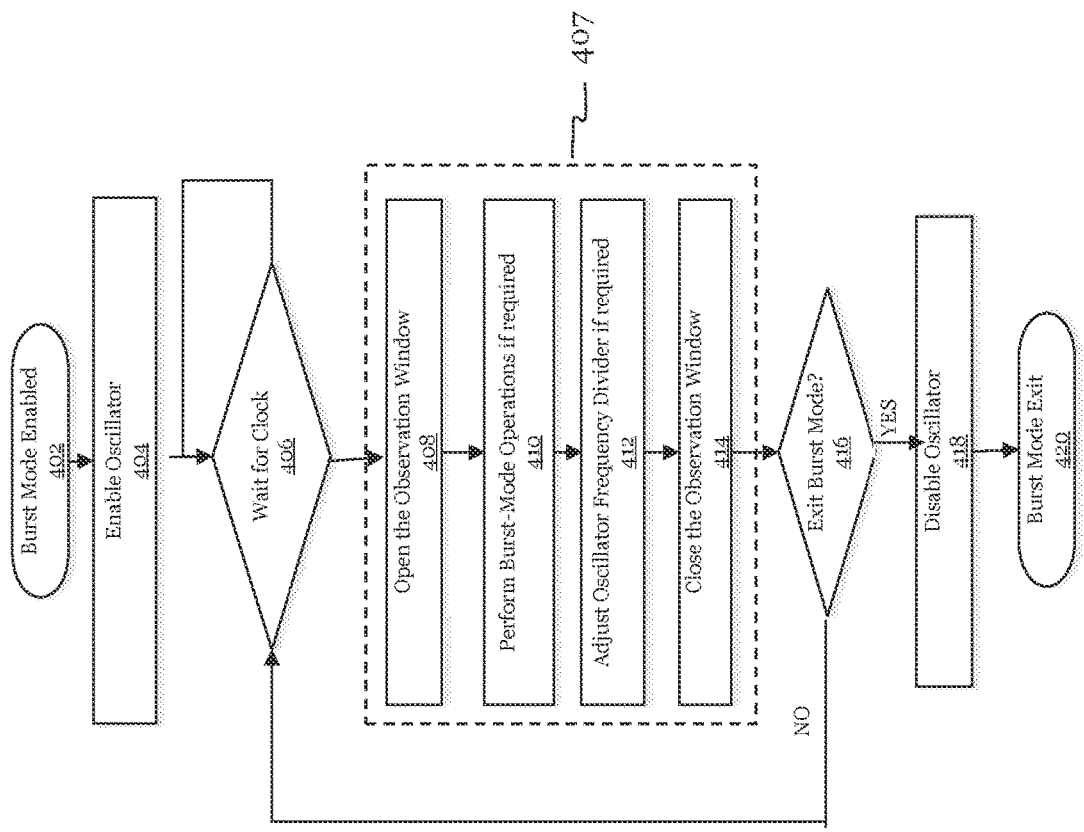
FIG. 4 illustrates a flow chart depicting a method 400 to operate a power converter in an adaptively-sampled low-power burst mode of an embodiment.

FIG. 4 illustrates a flow chart depicting a method 400 to operate a power converter in an adaptively-sampled low-power burst mode of an embodiment.

At a step 402, the burst mode is enabled. In various embodiments, the burst mode may be enabled by a burst-mode enable signal 217. At a step 404, an oscillator 214 may be enabled. The oscillator 214 may be enabled by the burst-mode enable signal 217. At a step 406, the system may wait to enable sampling of an output voltage a power converter. In various embodiments, samples may be triggered by a rising edge of an adapted clock signal. However, as will be appreciated, the falling edge of an adapted clock signal may be used or other time derived from an adapted clock signal. In various embodiments, an adapted clock signal may have default or initial setting that determines the frequency an adapted clock signal before voltage at an output has been sampled.

Once triggered by the adapted clock signal, at a step 408, the monitoring circuitry may enter an observation period 407 where the voltage monitor 216 and auxiliary analog block 218 are enabled. A burst may be initiated and performed at step 410, if needed. And, the adapted clock signal may be adjusted at step 412, if needed. The observation window may be closed at step 414 and the voltage monitor 216 and auxiliary analog block 218 disabled.

At as step 416, it may be determined if the burst-mode is still enabled. This may be determined by the status of the burst-mode enable signal 217. If the burst mode is still enabled after closing of the observation window, the method may comprise returning to step 406 to wait for the adapted clock signal to trigger another observation window. As will be appreciated, this may occur at the next rising edge of the adapted clock signal 215A, in various embodiments. It may also be triggered by the falling edge of adapted clock signal 215A in various embodiments, or at other times derived from the adapted clock signal 215A.

In various embodiments, step 416 may be performed continuously or contemporaneous with other steps. For example, the burst-mode enable signal 217 may be continuously monitored. This may allow a quicker response if the mode of operation changes. This may be beneficial in various embodiments because auxiliary circuits may be activated to switch out of a burst mode. By continuously monitoring the mode of operation (or contemporaneously with other steps), any activations needed to switch modes may be initiated as soon as a change in mode is detected. This may reduce or eliminate a latency associated with switching modes.

If the burst mode is no longer enabled at step 416, then the method may proceed to step 418. This may be determined by the status of the burst-mode enable signal 217. At step 418, the oscillator 214 may be disabled. And, at step 420, the burst mode may be exited. And, the power converter may begin, or resume, standard operations.

Figure 5:
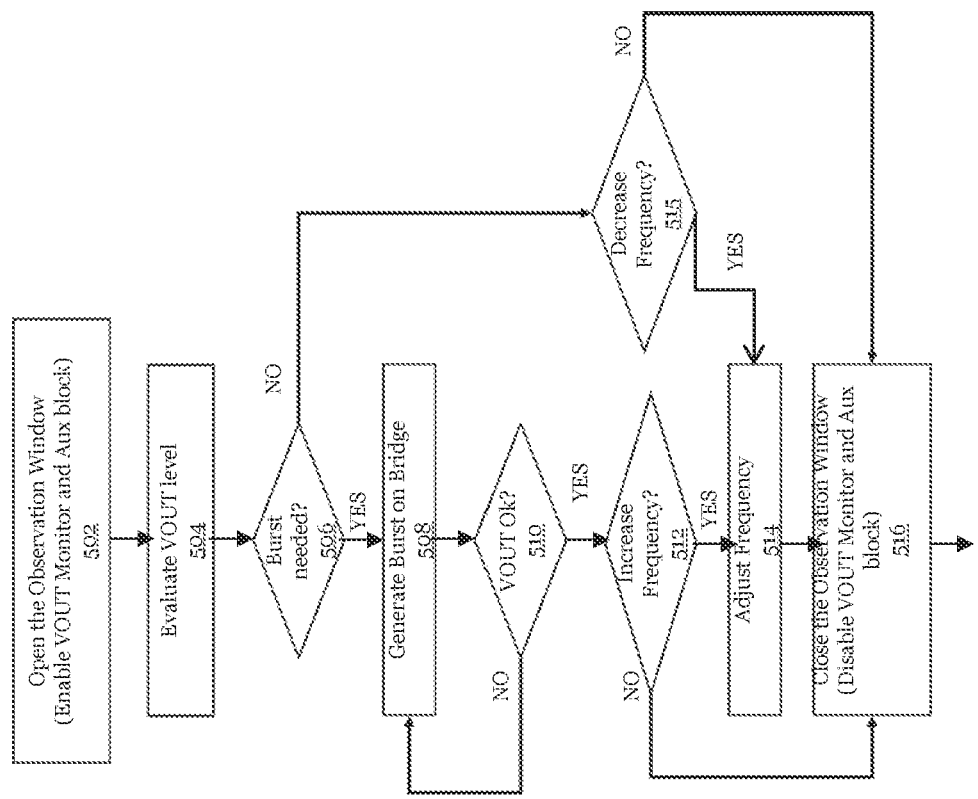
FIG. 5 illustrates a flow chart depicting a method to implement the observation window of an adaptively-sampled low-power burst mode of an embodiment.

FIG. 5 illustrates a flow chart depicting a method 500 to implement the observation window of an adaptively-sampled low-power burst mode of an embodiment.

In various embodiments, a method 500 may comprise at a step 502 opening an observation window. This may include enabling the voltage monitor 216 and auxiliary analog block 218. This step may correspond to the step 408 as discussed with reference to FIG. 4.

A method 500 may comprise at a step 504 evaluating the voltage at an output of a power converter such as output 206. This may involve sensing the output voltage of a power converter according to known techniques and with known equipment. After evaluating the output voltage, the method may comprise at a step 506 determining whether to initiate a burst. In various embodiments, the output voltage detected by the voltage monitor may be compared with a minimum level or threshold for the output voltage. If the output voltage sensed at step 504 is lower than the minimum level or threshold, a burst may be generated at step 508.

After generation of the burst at step 508, the voltage at the output may be detected again. The output voltage may again be compared with a minimum level or threshold to determine whether it is okay. In various embodiments, the voltage monitor may continuously detect the voltage at the output of the converter while the observation window is open. In various embodiments, the burst may be continuously generated until the output voltage has reached a minimum level. The minimum value or threshold used for comparison at step 510 may be the same minimum level or threshold value used for comparison with the output voltage at step 506. In various embodiments, minimum value or threshold used for comparison at step 510 may be a different minimum level or threshold value used for comparison with the output voltage at step 506. For example, the voltage level to trigger a burst, may be the same (in various embodiments) or different (in various embodiments) from the voltage level to determine whether additional bursts are needed.

If the output voltage at step 510 does not exceed the threshold, the method may be looped back to step 508 and generate another burst. This loop may continue until the output voltage is raised to a sufficient voltage level.

Once it has been determined that the voltage at the output has been sufficiently raised, it may be determined at step 512 whether to increase the frequency of the output voltage sampling. In various embodiments, this may comprise increasing the frequency of the adapted clock signal.

As will be appreciated, considerations for determining whether to increase the sampling frequency may differ in different embodiments. There is a multitude of different ways to gauge whether the frequency of the adapted clock signal needs to be changed. Some examples are provided below. However, these examples are only provided for illustrative purposes. Other approaches may be utilized to adapt the sampling frequency of the regulated output voltage. In various embodiments, adaptive sampling may be utilized to maintain a steady state between a ratio of bursts to samples. For example, the ratio of samples to bursts may be maintained by adaptive sampling at 2 to 1, 4 to 1, or in a range between 2 to 1 and 4 to 1. Any other ratio or range may be maintained in various embodiments with adaptive sampling of the output.

In various embodiments, the number of clock cycles (or observation windows) between bursts may be tracked. If the number of clock cycles between bursts is lower than desired this may indicate that the voltage output is not be sampled frequently enough and the frequency for sampling the output may be increased. In various embodiments, if bursts are generated in consecutive observation windows the frequency used for sampling the output voltage may be increased. In various embodiments, the number of cycles where bursts occur and the number of cycles where bursts do not occur may be tracked and compared with each other to determine whether to increase the frequency used for sampling. For example, if the number of cycles where bursts are needed is higher than desired relative to the number of cycles where bursts are needed, the frequency used for sampling may be increased.

In various embodiments, a determination about whether to increase a sampling frequency may depend on a voltage threshold for adapting the sampling frequency. The voltage detected at output of the converter by the voltage monitor may be compared with the threshold to adapt the sampling frequency. The voltage threshold to adapt the sampling frequency may be lower than the level or threshold used to determine whether to generate a burst. If the output level falls below this lower threshold, the frequency may be increased.

In various embodiments, a determination about whether to increase a sampling frequency may depend on the number of bursts needed to increase the voltage level. For example, each loop through step 508 may be counted in various embodiments. If the number of bursts (or loops through step 508) is greater than a threshold, the frequency for sampling the output may be increased. In various embodiments, the number of bursts provided in each cycle may also be counted directly.

In various embodiments, a rolling average of the number of observation window opened between bursts may be tracked. If this number is less than desired (lower than a threshold) the frequency may be increased.

If it is determined at step 512 that the frequency used to sample the output voltage needs to increased, then the frequency may be increased at step 514. If it is determined at step 512 that the frequency used to sample the output voltage does not need to be increased, then step 514 may be skipped. And, the observation window may be closed at step 516. Closing the observation window may entail disabling the voltage monitor 216 and auxiliary analog block 218.

Returning to step 506, if it is determined that a burst is not needed, it may be determined at step 515 whether to decrease the frequency at which the output voltage is sampled. If it is determined at step 515 that frequency will be adjusted, the method may proceed to step 514. If it is determined that the frequency will not be adjusted, the method may proceed to step 516. As will be appreciated, the process for determining whether to decrease the frequency may differ in different embodiments. There are many different ways to gauge whether the frequency of the adapted clock signal needs to be decreased. Some examples are provided below. However, these examples are only provided for explanatory purposes. Other approaches may be utilized For example, the number of clock cycles (or observation windows) between bursts may be tracked. If the number of clock cycles is higher than desired, this may indicate that the output of the converter is being sampled too much. The frequency for sampling the output may be decreased.

In various embodiments, the number of cycles where bursts occur and the number of cycles where bursts do not occur may be tracked and compared with each other to determine whether to decrease the frequency used for sampling. For example, if the number of cycles where no bursts are needed is higher than desired relative to the number of cycles where bursts are needed, the frequency used for sampling may be decreased.

In various embodiments, the voltage output may be compared with another voltage threshold that is higher than the minimum level or threshold used to determine whether to generate a burst. If the output level stays above this threshold, this may indicate that output is being sampled more than is ideal and the sampling rate may be decreased. For example, if the voltage level falls below the higher threshold and remains above a threshold used to determine whether to generate a burst, the sampling frequency may be decreased. In various embodiments, a rolling average of the number of observation windows between bursts may be tracked and the frequency may be decreased if this number is higher than desired. In various embodiments, decreasing the sampling frequency may comprise adjusting the adapted clock signal.

After it is determined at step 515 whether or not to decrease the sampling frequency of the output, the observation window may be closed at step 516. This may comprise disabling the voltage monitor. Auxiliary circuits may also be disabled.

Figure 6:
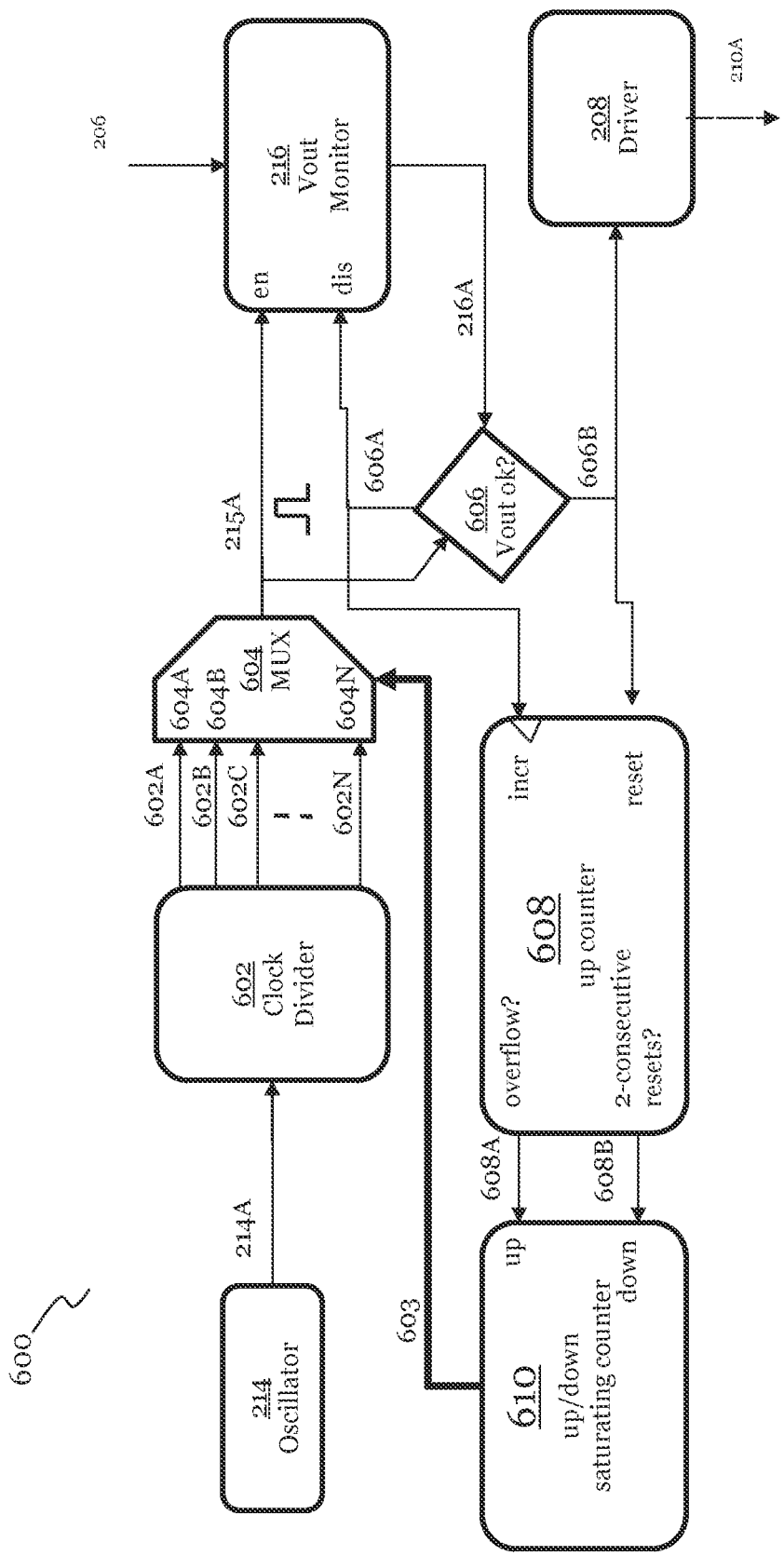
FIG. 6 depicts a system to adapt a sampling frequency for the output of a power converter in a low power burst mode of an embodiment.

FIG. 6 depicts a system 600 to adapt a sampling frequency for the output of a power converter in a low power burst mode of an embodiment.

The system 600 may include an oscillator 214. The oscillator 214 may comprise a low speed clock in various embodiments. The system 600 may further comprise a clock divider 602 and a multiplexer, MUX 604. A voltage monitor 216 may be used in the system 600 to detect the voltage at the output 206 of a DC-DC power converter. The system 600 may further comprise a bridge driver 208 and a voltage check circuit 606. The system 600 may further comprise an up counter 608 and an up/down counter 610. The up/down counter 610 may comprise a saturating up/down counter.

In various embodiments, the oscillator 214 may be enabled by a burst mode enable signal 217 (not shown in FIG. 6). When enabled, the oscillator 214 may supply the clock signal 214A to the clock divider 602. The clock divider 602, in turn, may output a number of signals. Each of the signals may have a frequency equal to the quotient of the frequency of the clock signal 214A and a divisor. For example, a first signal 602A may have the same frequency as the clock signal 214A. A second signal 602B may have a frequency equal to the frequency of the clock signal 214A divided by 2. A third signal 602C may have a frequency equal to the frequency of the clock signal 214A divided by 4. An Nth output 602N may have a frequency equal to the frequency of the clock signal 214A divided by a number X The value for the number X may be derived from the number of outputs. For example, X may be equal to $2^N$ or $2^{(N-1)}$. In various embodiments, the clock divider 602 may have 8 outputs and X may be equal to 128. As will be appreciated, the number of signals output from the clock divider 602 may be different from embodiment to embodiment. And, as will also be appreciated, the divisors may vary in different embodiments.

The signals output from the clock divider 602 may be provided to a MUX 604. The MUX may output one of the signals depending on a frequency-selection signal 603. The frequency-selection signal 603 may comprise three bits in various embodiments. The number of bits of the frequency-selection signal may be different in different embodiments.

The MUX may comprise a first input 604A, a second input 604B, and an Nth input 604N. Various embodiments of the MUX 604 may have different numbers of inputs. The number of inputs of the MUX 604 may correspond to the number of output signals produced by the clock divider 602. The inputs may correspond to a bit value. The number of bits of the frequency-selection signal may be at least big enough to select each potential input to the MUX. For example, an 8-input MUX may have a 3-bit frequency-selection signal. When the frequency-selection signal 603 transmits a bit value that corresponds to the input, the MUX 604 may output the corresponding input. For example, if the first input 604A is corresponded to a bit value of "000," the MUX will output the signal provided to the first input 604A when the frequency-selection signal transmits a "000." The output of the MUX 604 may comprise the adapted clock signal 215A.

In various embodiments, the voltage monitor 216 may be enabled by the adapted clock signal 215A. For example, the when the adapted clock signal 215A is high, the voltage monitor 216 may be enabled. The adapted clock signal 215A may also enable auxiliary analog blocks 218 that are not shown in FIG. 6.

When enabled, the voltage monitor 216 may detect the voltage at output 206 of a converter. An output signal 216A from the voltage monitor 216 may be transmitted to a voltage check circuit 606 where the voltage detected by the voltage monitor 216 to determine if a burst is needed to raise the output voltage at the output 206. If the voltage at the output 206 is okay (no burst is needed), a no-burst signal 606A may be asserted. If the voltage at the output 206 is not okay (a burst is needed), a burst signal 606B may be asserted. The voltage check circuit 606 may check the voltage with the frequency of the adapted clock signal 215A. The adapted clock signal 215A may be provided to the voltage check circuit 606.

In various embodiments, the no-burst signal may be provided to the voltage monitor 216. The no-burst signal 606A may disable the voltage monitor 216. This may save power by turning off the voltage monitor 216 when it is not needed. The no-burst signal 606A may also disable auxiliary analog blocks 218 (not shown in FIG. 6). The burst signal 606B may be provided to the bridge driver 208. When asserted the burst signal 608B may be cause the bridge driver 208 to initiate a burst.

In various embodiments, the no-burst signal 606A and the burst signal 606B are provided to an up counter 608. The up counter 608 may be used to track how often bursts are required by a converter relative to periods where no bursts are needed. When asserted, the no-burst signal 606A may increment the up counter 608. And, when asserted, the burst signal 606B may reset the up counter 608. When the up counter 608 overflows, an overflow signal 608A may be provided to an up/down counter 610. For a two-bit bit counter, the up counter 608 overflows when samples without bursts exceeds samples with bursts by 4. However, the up counter may comprise a different number of bits in various embodiments.

An overflow signal 608A, when asserted, may cause the up/down counter 610 to be incremented, which in turn may change the value of the frequency-selection signal 603. The MUX 604 may be configured so that it selects a slower signal when the frequency-selection signal is incremented thereby adapting the frequency of the adapted clock signal 215A based on the voltage at the output 206 so the adapted clock signal will be slowed down as less bursts are needed to maintain the voltage at the output 206 at a desired level. As will be appreciated, the number of bits of the up counter 608 may vary in different embodiments. The size of the up counter, in various embodiments may impact when an overflow signal 608A is asserted thus impacting when the up/down counter is incremented and how often the adapted clock signal 215A changes.

The up counter 608 may also be configured to assert a decrement signal 608B after consecutive resets. The number of resets needed to trigger assertion of the decrement signal 608B may be different in different embodiments. In some embodiments, two consecutive resets of the up counter 608 may trigger assertion of the decrement signal 608B. In some embodiments three consecutive resets of the up counter 608 may trigger assertion of the decrement signal 608B. The decrement signal 608B may be triggered by more than three consecutive resets in various embodiments.

The decrement signal 608B, when asserted may cause the up/down counter 610 to be decremented thus altering the frequency-selection signal 603 and the output of the MUX 604. The MUX may be configured so that it selects a faster signal when the frequency-selection signal is decremented thereby adapting the frequency of the adapted clock signal 215A based on the voltage at the output 206 so the adapted clock signal will be speed up as more bursts are needed to maintain the voltage at the output 206 at a desired level.

As will be appreciated, components of the system 600 may differ in different embodiments. For example, the sizes of the up/down counter 610 and up counter 608 may be different in different embodiments. Different sizes of the up counter may be used so the adapted clock signal 215A is changed more or less often. The size of the up/down counter 610 may be corresponded to the number of different input signals provided to the MUX 604. In various embodiments, the frequency adaption circuit 215 may comprise a MUX 604 and clock divider 602.

Figure 7:
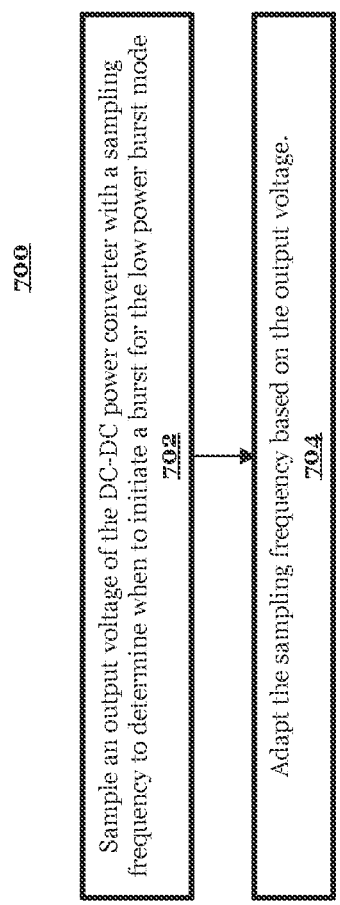
FIG. 7 depicts a flow chart of the steps method to operate a power converter in a low power burst mode of an embodiment.

FIG. 7 depicts a flow chart of the steps method 700 to operate a power converter in a low power burst mode of an embodiment.

In various embodiments, the method 700 to operate a DC-DC power converter in a low power burst mode may comprise at a step 702 sampling an output voltage of the DC-DC power converter with a sampling frequency to determine when to initiate a burst for the low power burst mode; and at a step 704 adapting the sampling frequency based on the output voltage.

In various embodiments, the method 700 may further comprise initiating a burst when the output voltage falls below a voltage threshold.

In various embodiments, the method 700 may further comprise increasing the sampling frequency when the output voltage falls below a lower voltage threshold.

In various embodiments, the method 700 may further comprise, wherein adapting the sampling frequency comprises increasing the sampling frequency in response to an increase in an electric load powered by the output voltage.

In various embodiments, the method 700 may further comprise, wherein adapting the sampling frequency comprises decreasing the sampling frequency in response to a decrease in an electric load powered by the output voltage.

In various embodiments, the method 700 may further comprise, counting a number of consecutive samples of the output voltage that do not trigger a burst; determining that the number exceeds an upper threshold; and wherein adapting the sampling frequency comprises lowering the sampling frequency.

In various embodiments, the method 700 may further comprise wherein the upper threshold is equal to 3.

In various embodiments, the method 700 may further comprise tracking a ratio of samples of the output voltage to bursts; determining that the ratio is too high; and wherein adapting the sampling frequency comprises lowering the sampling frequency.

In various embodiments, the method 700 may further comprise, tracking a ratio of samples of the output voltage to bursts; determining that the ratio is too low; and wherein adapting the sampling frequency comprises increasing the sampling frequency.

In various embodiments, the method 700 may further comprise determining that a number of samples of the output voltage occurring between a first burst and a second burst is less than a lower threshold; and wherein adapting the sampling frequency comprises increasing the sampling frequency.

In various embodiments, the method 700 may further comprise, determining that bursts have been initiated for two consecutive samples of the output voltage; and wherein adapting the sampling frequency comprises increasing the sampling frequency.

In various embodiments, systems other than power converters that are operated in a burst or other forms of discrete corrections may be adaptively sampled according to present disclosure by monitoring an output variable of the system and adjusting the sampling frequency of the output variable according to measurements of the output variable. For example, temperature control that accomplished by an actuator (such as a heater) operating in bursts could be monitored by sampling the temperature and adjusting the sampling rate. In another example, a linear voltage regulator where the gate signal of the output MOS is driven by a capacitor may have a circuit providing "up" or "down" pulses according to an output voltage monitor, which may turned on according to an adaptive sampling frequency.

Example 1. A method to operate a DC-DC power converter in a low power burst mode, the method including sampling an output voltage of the DC-DC power converter with a sampling frequency to determine when to initiate a burst for the low power burst mode; and adapting the sampling frequency based on the output voltage.

Example 2. The method of Example 1, further including initiating a burst when the output voltage falls below a voltage threshold.

Example 3. The method of Example 1 and Example 2, further including increasing the sampling frequency when the output voltage falls below a lower voltage threshold.

Example 4. The method of Example 1 through Example 3, further including, wherein adapting the sampling frequency includes increasing the sampling frequency in response to an increase in an electric load powered by the output voltage.

Example 5. The method of Example 1 through Example 4, wherein adapting the sampling frequency includes decreasing the sampling frequency in response to a decrease in an electric load powered by the output voltage.

Example 6. The method of Example 1 through Example 5, further including counting a number of consecutive samples of the output voltage that do not trigger a burst; determining that the number exceeds an upper threshold; and wherein adapting the sampling frequency includes lowering the sampling frequency.

Example 7. The method of Example 1 through Example 6, wherein the upper threshold is equal to 3

Example 8. The method of Example 1 through Example 8, further including tracking a ratio of samples of the output voltage to bursts; determining that the ratio is too high; and wherein adapting the sampling frequency includes lowering the sampling frequency.

Example 9. The method of Example 1 through Example 8, further including tracking a ratio of samples of the output voltage to bursts; determining that the ratio is too low; and wherein adapting the sampling frequency includes increasing the sampling frequency.

Example 10. The method of Example 1 through Example 9, further including determining that a number of samples of the output voltage occurring between a first burst and a second burst is less than a lower threshold; and wherein adapting the sampling frequency includes increasing the sampling frequency.

Example 11. The method of Example 1 through Example 10, further including determining that bursts have been initiated for two consecutive samples of the output voltage; and wherein adapting the sampling frequency includes increasing the sampling frequency.

Example 12. A system to set a sampling frequency of an output voltage of a DC-DC power converter during a low power burst mode of the DC-DC power converter, the system including: a frequency-adaptation circuit configured to receive a clock signal having a first frequency and output an adapted clock signal having an adapted frequency that depends on the output voltage of the DC-DC power converter; and a voltage-monitoring circuit enabled by the adapted clock signal to sample the output voltage of the DC-DC power converter with the adapted frequency.

Example 13. The system of Example 12 further including, a control logic circuit configured to receive the output voltage sampled by the voltage-monitoring circuit and communicate a frequency-selection signal to the frequency-adaptation circuit, the frequency-adaptation circuit being configured to adjust the adapted frequency according to changes in the frequency-selection signal and the frequency-selection signal being determined from the output voltage sampled by the voltage-monitoring circuit.

Example 14. The system of Example 12 and Example 13, further including, wherein the control logic circuit is configured to output a burst-command signal when the output voltage falls below a voltage threshold.

Example 15. The system of Example 12 to Example 14, wherein the frequency-adaptation circuit includes: a clock divider configured to receive the clock signal at a clock-signal input and configured to output a number of signals having frequencies that are quotients of the clock signal; and a multiplexer configured to receive the number of signals and select one of the number of signals to output as the adapted clock signal based on a frequency-selection signal that is determined from the output voltage sampled by the voltage-monitoring circuit.

Example 16. The system of Example 12 to Example 15, wherein the number of signals is equal to eight and the frequency-selection signal is a three-bit signal.

Example 17. A system to provide an adapted sampling frequency for sampling an output voltage of a DC-DC power converter in a low power burst mode, the system including: an oscillator configured to produce a clock signal; a frequency-adaptation circuit configured to receive the clock signal and output an adapted clock signal including the adapted sampling frequency, the adapted sampling frequency being determined by a frequency-selection signal; and a tracking circuit configured to receive data indicating when a burst for the low power burst mode is initiated and output the frequency-selection signal depending on the data.

Example 18. The system of Example 17, wherein the frequency-adaptation circuit includes: a clock divider configured to receive the clock signal at a clock-signal input and configured to output a number of signals having frequencies that are quotients of the clock signal; and a multiplexer configured to receive the number of signals and the frequency-selection signal, the multiplexer being configured to select one of the number of signals to output as the adapted clock signal based on the frequency-selection signal.

Example 19. The system of Example 17 and 18, wherein the tracking circuit includes an up counter in communication configured to be incremented when bursts are initiated and reset when bursts are not initiated; and a saturating up-and-down counter configured to receive an overflow signal from the up counter and increment a count each time the up counter overflows, and configured to decrement the count when up counter is reset twice consecutively, the count be provided to the multiplexer as the frequency-selection signal.

Example 20. The system of Example 17 through Example 19, wherein the frequency-select signal is a 3-bit signal, the up counter is a 2-bit counter, and the saturating up-and-down counter is a 3-bit counter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method to operate a DC-DC power converter in a low power burst mode, the method comprising:
   sampling an output voltage of the DC-DC power converter with a sampling frequency to determine when to initiate a burst for the low power burst mode; and
   adapting the sampling frequency based on the output voltage, adapting comprising:
      incrementing an up counter in response to the burst being initiated,
      resetting the up counter in response to the burst not being initiated,
      incrementing a saturating up-and-down counter upon receipt of an overflow signal from the up counter,
      decrementing the up counter in response to the up counter being reset, and
      selecting the sampling frequency according to a count of the saturating up-and-down counter.

2. The method of claim 1, further comprising initiating a burst when the output voltage falls below a voltage threshold.

3. The method of claim 2, further comprising increasing the sampling frequency when the output voltage falls below a lower voltage threshold.

4. The method of claim 1, wherein adapting the sampling frequency comprises increasing the sampling frequency in response to an increase in an electric load powered by the output voltage.

5. The method of claim 1, wherein adapting the sampling frequency comprises decreasing the sampling frequency in response to a decrease in an electric load powered by the output voltage.

6. The method of claim 1, further comprising:
   counting a number of consecutive samples of the output voltage that do not trigger a burst;
   determining that the number exceeds an upper threshold; and
   wherein adapting the sampling frequency comprises lowering the sampling frequency.

7. The method of claim 6, wherein the upper threshold is equal to 3.

8. The method of claim 1, further comprising:
   tracking a ratio of samples of the output voltage to bursts;
   determining that the ratio is too high; and
   wherein adapting the sampling frequency comprises lowering the sampling frequency.

9. The method of claim 1, further comprising:
   tracking a ratio of samples of the output voltage to bursts;
   determining that the ratio is too low; and
   wherein adapting the sampling frequency comprises increasing the sampling frequency.

10. The method of claim 1, further comprising:
    determining that a number of samples of the output voltage occurring between a first burst and a second burst is less than a lower threshold; and
    wherein adapting the sampling frequency comprises increasing the sampling frequency.

11. The method of claim 1, further comprising:
    determining that bursts have been initiated for two consecutive samples of the output voltage; and
    wherein adapting the sampling frequency comprises increasing the sampling frequency.

12. The method of claim 1, further comprising:
    dividing a clock signal to produce a plurality of divided clock signals having frequencies that are quotients of the clock signal;
    selecting a divided clock signal of the plurality of divided clock signals using a multiplexer, wherein a select signal of the multiplexer is based on the count of the saturating up-and-down counter; and
    providing the selected divided clock signal to the DC-DC power converter.

13. The method of claim 1, wherein the up counter is a 2-bit counter, and the saturating up-and-down counter is a 3-bit counter.

14. A system to set a sampling frequency of an output voltage of a DC-DC power converter during a low power burst mode of the DC-DC power converter, the system comprising:

a frequency-adaptation circuit configured to receive a clock signal having a first frequency and output an adapted clock signal having an adapted frequency that depends on the output voltage of the DC-DC power converter;

a voltage-monitoring circuit enabled by the adapted clock signal to sample the output voltage of the DC-DC power converter with the adapted frequency; and a tracking circuit coupled to the frequency-adaptation circuit, the tracking circuit configured to receive data indicating when a burst for the low power burst mode is initiated and output a frequency-selection signal depending on the data, the tracking circuit comprising:

an up counter in communication configured to be incremented when bursts are initiated and reset when bursts are not initiated, and a saturating up-and-down counter configured to receive an overflow signal from the up counter and increment a count each time the up counter overflows, and configured to decrement the count when up counter is reset twice consecutively, the count be provided to the frequency-adaptation circuit as the frequency-selection signal.

15. The system of claim 14, further comprising a control logic circuit configured to output a burst-command signal when the output voltage falls below a voltage threshold.

16. The system of claim 14, wherein the frequency-adaptation circuit comprises:

a clock divider configured to receive the clock signal at a clock-signal input and configured to output a number of signals having frequencies that are quotients of the clock signal; and a multiplexer configured to receive the number of signals and select one of the number of signals to output as the adapted clock signal based on the frequency-selection signal.

17. The system of claim 16, wherein the number of signals is equal to eight and the frequency-selection signal is a three-bit signal.

18. A system to provide an adapted sampling frequency for sampling an output voltage of a DC-DC power converter in a low power burst mode, the system comprising:

an oscillator configured to produce a clock signal;

a frequency-adaptation circuit configured to receive the clock signal and output an adapted clock signal comprising the adapted sampling frequency, the adapted sampling frequency being determined by a frequency-selection signal; and a tracking circuit configured to receive data indicating when a burst for the low power burst mode is initiated and output the frequency-selection signal depending on the data, the tracking circuit comprising:

an up counter in communication configured to be incremented when bursts are initiated and reset when bursts are not initiated; and a saturating up-and-down counter configured to receive an overflow signal from the up counter and increment a count each time the up counter overflows, and configured to decrement the count when up counter is reset twice consecutively, the count be provided to the frequency-adaptation circuit as the frequency-selection signal.

19. The system of claim 18, wherein the frequency-adaptation circuit comprises:

a clock divider configured to receive the clock signal at a clock-signal input and configured to output a number of signals having frequencies that are quotients of the clock signal; and a multiplexer configured to receive the number of signals and the frequency-selection signal, the multiplexer being configured to select one of the number of signals to output as the adapted clock signal based on the frequency-selection signal.

20. The system of claim 18, wherein the frequency-selection signal is a 3-bit signal, the up counter is a 2-bit counter, and the saturating up-and-down counter is a 3-bit counter.

* * * * *